Aug. 24, 1937.   E. F. MAYNE   2,091,006
PNEUMATIC TIRE
Filed Jan. 5, 1935   2 Sheets-Sheet 1
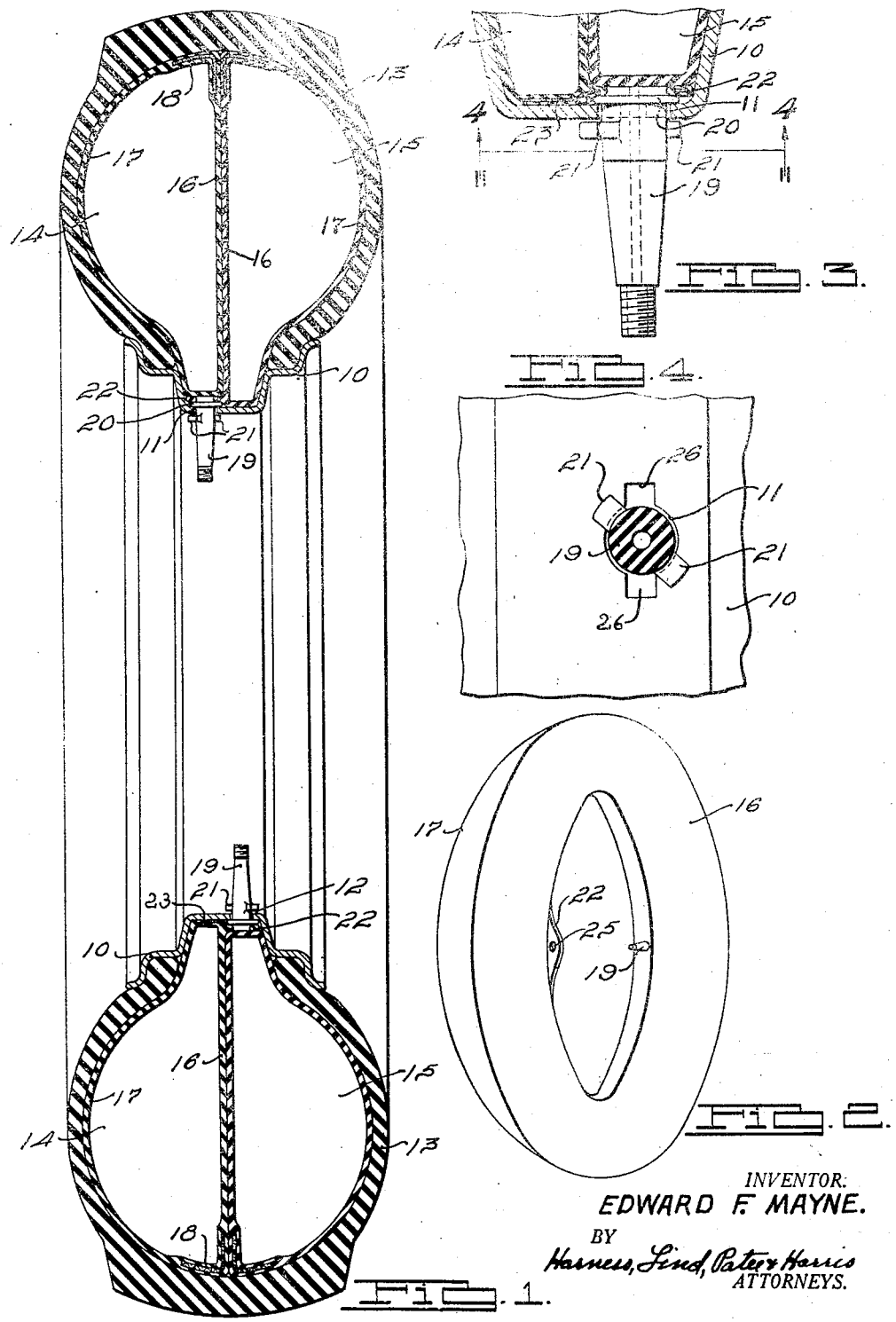
INVENTOR:
EDWARD F. MAYNE.
BY
Harness, Lind, Pater & Harris
ATTORNEYS.

Aug. 24, 1937. E. F. MAYNE 2,091,006
PNEUMATIC TIRE
Filed Jan. 5, 1935  2 Sheets-Sheet 2
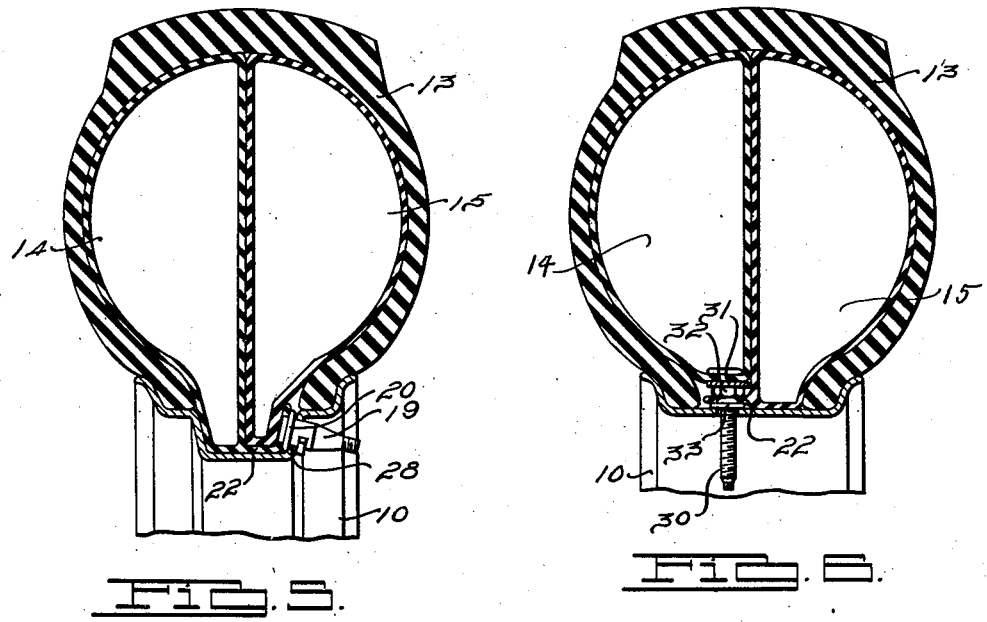
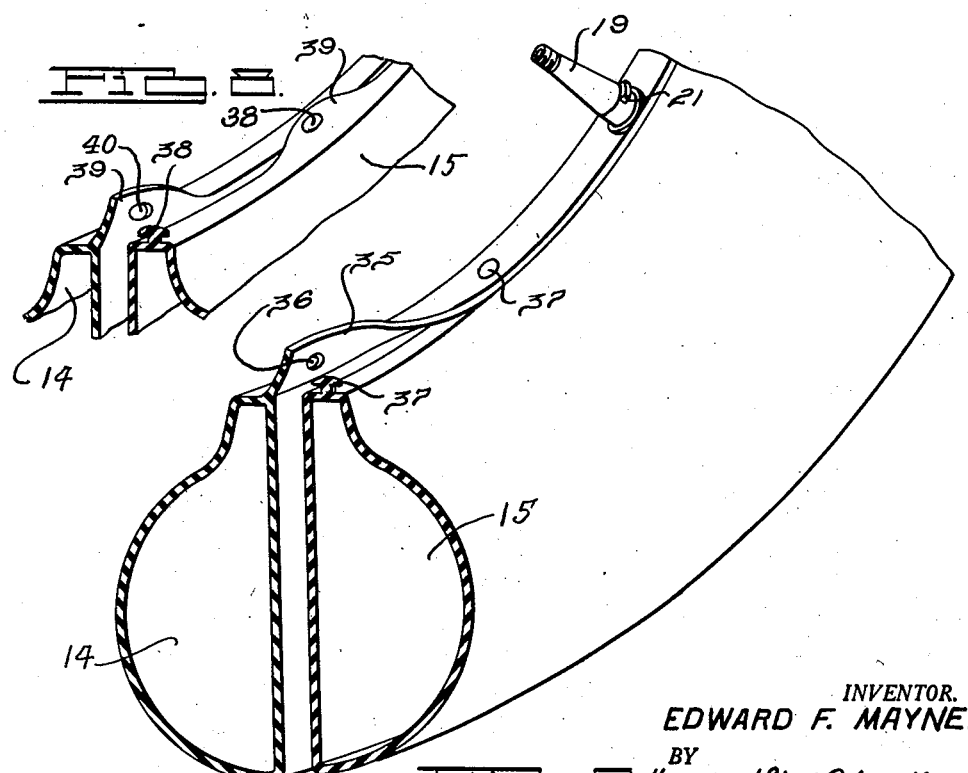
INVENTOR.
EDWARD F. MAYNE.
BY
ATTORNEYS.

Patented Aug. 24, 1937

2,091,006

UNITED STATES PATENT OFFICE 2,091,006

PNEUMATIC TIRE

Edward F. Mayne, Detroit, Mich.

Application January 5, 1935, Serial No. 518

13 Claims. (Cl. 152—22)

My invention relates to pneumatic tires for automotive vehicles and it has particular relation to the sealed air containers constituting a portion of such tires.

More particularly, my invention relates to a double envelope adapted to be used in pneumatic tire casings and to a means for securing the two envelopes in their proper cooperative relationship.

Heretofore, it has been customary to employ but a single inner tube in pneumatic tire casings, the result being that when such tube is punctured, the tire is completely deflated, thus necessitating a change of tires regardless of the urgency of the journey engaged upon and regardless of the time and location at which the puncture occurs. In addition, if the tire is blown out, it is deflated very rapidly which, with the present type of large diameter tires and small diameter wheels, may become a source of considerable danger, especially if the vehicle is travelling at a high rate of speed at the time the blow out occurs.

By my invention, I have eliminated the necessity of changing tires when a puncture occurs and have eliminated the danger incident to a blow out regardless of the speed at which the vehicle is travelling.

For a better understanding of my invention, reference may now be had to the accompanying drawings, of which:

Fig. 1 is a vertical cross-sectional view of a tire mounted upon a wheel rim and provided with an air container constructed in accordance with my invention.

Fig. 2 is a perspective view of one of the pair of double inner tubes illustrated in Fig. 1.

Fig. 3 is a detail cross-sectional view of the structure illustrated in Fig. 1 showing a means of securing one of the inner tubes to the other.

Fig. 4 is a cross-sectional view of the structure illustrated in Fig. 3, the section being taken along the line IV—IV thereof.

Fig. 5 is a cross-sectional view of a modified form of my invention in which the valve stem protrudes from the side of the depressed portion of a drop center rim.

Fig. 6 is a modified form of my invention employing the ordinary type of tire rim and employing the standard metal type of valve.

Figs. 7 and 8 are perspective views illustrating modified forms of my invention.

Referring more particularly to the drawings, I have illustrated a rim 10 of the drop center type provided with two valve stem openings 11 and 12, one of which is disposed in one side of the rim and the other disposed in the diametrically opposite side of the rim. Mounted upon the rim 10 is a tire casing 13 within which are disposed in side-by-side relationship two similar inner tubes 14 and 15. Each of these tubes is molded into a semi-circular cross-sectional contour having a substantially straight portion 16 and an arcuate portion 17. At the juncture of the portions 16 and 17 the tube is reinforced, as indicated at 18, with any suitable material, such as a layer of fabric, cloth, or the like. Each of the tubes 14 and 15 is provided with a valve stem 19 of the flexible rubber type. The valve stem is provided with an integral annular collar 20 disposed a short distance from its point of juncture with the inner tube and with two oppositely disposed integral arcuate lugs 21 disposed in spaced relation to the collar 20 for a purpose to be hereinafter set forth. Each tube is provided with an integral flap 22 disposed diametrically opposite from its valve stem and in proximity to the valve stem of the companion tube. As best shown in Figs. 2 and 3, the flap 22 is reinforced, as indicated at 23, and is provided with an opening or aperture 25 which fits over the rubber valve stem 19 of the companion tube and into the groove between the annular collar 20 and the point of juncture with the tube. As the flap 22 is composed of resilient material it is snapped over the valve stem of the other tube in the position shown in Fig. 3, and thus retains the two tubes in proper relationship with the two flat sides 16 thereof in adjoining relation. The flap 22 of the second tube is likewise snapped over the valve stem of the other tube, thus securing the tubes together at two diametrically opposite points.

With the tubes properly secured together by means of the flaps 22, it is impossible to pinch one of the tubes with the valve stem of the other tube. Likewise, the assembled relationship of the tubes permits of readily inserting and removing them as a unit from the casing for purposes of repair and inspection. In the event that one of the tubes has been damaged to any material degree so that it does not justify repair, the two tubes may be readily disassociated by removing the flap of each tube from the valve stem of the other tube and a second tube in good condition secured to the remaining tube in the same manner.

As illustrated in Fig. 4, the valve stem opening 11 in the rim 10 is provided with two diametrically opposite recesses 26. The lugs 21 on the valve stem 19 are mounted thereon at an angle to the recess 26 but are of such size that they can readily pass therethrough when the valve stem is twisted slightly, which can readily be accomplished owing to the fact that all portions of both tubes are very flexible.

In mounting the tire on the rim, the two inner tubes, secured together as previously described, are inserted in assembled relationship into the tire casing, one side of which has already been placed on the rim. The valve stems are then inserted in the valve openings and, by means of the stems the tubes are twisted so that the lugs 21 may pass through the recesses 26. Upon releasing the stems they assume their natural position, which is at an angle to the recesses 26. This permits of applying an air hose to the end of the rubber valve stems without any danger of their pulling back into the rim of the tire, even though not properly inflated.

In the structure illustrated in Fig. 5, the rim is provided with an opening 28 in the side thereof through which the valve stem 19 projects. The valve stem is provided with the usual collar 20 and the tube with the usual flap 22, which fits thereover. The other tube of the pair is provided with a similar valve stem projecting through the diametrically opposite side of the rim (not shown).

In the structure illustrated in Fig. 6, the inner tube is provided with a valve stem 30 of the usual metallic type. This valve stem is provided with the customary valve stem spreader 31, which is held in place by means of a nut 32 mounted in threaded engagement with the valve stem 30. The nut 32 is provided with a centrally disposed annular groove 33 into which the flap 22, previously described, is snapped.

In the structure illustrated in Fig. 7, the flap 22 is replaced by an annular flap 35 which is provided with a plurality of openings or apertures 36 which fit over rubber rivets or retaining members 37 mounted on the cooperating inner tube. Likewise, the flap 35 is provided with an opening for the reception of the valve stem 19. The advantage of this structure is that the two tubes are secured together throughout their entire circumferences at their inner edges. If desired, a similar flap may be employed at the point of juncture of the two tubes at the outer periphery thereof, but such flap is not believed to be necessary as the straight sides of the tubes, together with the reinforced molded corners, serves to make them naturally assume the desired side by side position within the casing, especially as soon as any air is admitted to the tubes.

In the modification illustrated in Fig. 8, each tube is provided with a plurality of rubber rivets 38 and alternately disposed short flaps 39, each of which is provided with an opening 40, adapted to fit over the head of a correspondingly disposed rivet on the companion tube. The advantage of this type of construction is that the two companion tubes are identical, which is an advantage from a manufacturing standpoint, and are secured together throughout their circumferences.

Within the ordinary ranges of air pressure now employed, especially on passenger cars, the two tubes may be inflated equally; that is, with equal volumes of air, by inflating one side to a pressure of one-third of the ultimately desired pressure while the other side is deflated, and then inflating the second tube until the pressure reached therein reaches the desired total. It will be apparent that as long as there is any air at all in either tube, both tubes will reach the same pressure owing to the fact that they are separated only by a flexible wall.

With this arrangement of tubes, it is apparent that if one of the pair of tubes is punctured, the tire will not become deflated but the other tube will move to a position occupying the entire casing and will keep the casing inflated at one-third of the original pressure which, it has been found, is sufficient to permit continued and extensive travel without any danger of injuring the casing or tube and without any handicap to the operator of the car. In like manner, when a blow out occurs, the rubber of the inner tube which has been blow out, will tend to close the opening in the casing caused by the blow out, thus permitting the other tube to carry the load. In addition, it frequently occurs that the pressure of the air remaining in the second tube after a blow out is so low that the tube may even protrude slightly from the opening caused by the blow out without actually puncturing, thus permitting the car to be brought to a stop in safety, even though a severe blow out may have occurred.

Although I have illustrated several forms of my invention and have described in detail one application thereof, it will be apparent to those skilled in the art that it is not so limited but that various modifications and changes may be effected therein without departing from the spirit of my invention or from the scope of the appended claims.

What I claim is:

1. A pneumatic tire comprising a tire casing and a pair of inner tubes disposed therein, in side-by-side relationship, each provided with valve means for purposes of inflation, and means for securing the tubes together comprising means integral with each tube adapted to be readily detachably secured to the valve stem of the other tube.

2. A pneumatic tire comprising a tire casing and a pair of inner tubes disposed therein, each provided with valve means for purposes of inflation, and means for securing the tubes together comprising projections mounted on one tube and integral laterally extending flap means mounted on the other tube, said flap means being provided with openings adapted to fit over the projections of the other tube and being readily detachable therefrom.

3. A pneumatic tire comprising a tire casing and a pair of inner tubes disposed therein, each provided with valve means for purposes of inflation, and means for securing the tubes together comprising integral rubber projections on one tube and integral rubber flap means on the other tube, said flap means being provided with openings adapted to fit tightly over the rubber projections of the adjacent tube.

4. A pneumatic tire comprising a tire casing and a pair of inner tubes disposed therein, each provided with valve means for purposes of inflation, and means for securing the tubes together comprising integral flaps and projecting members arranged alternately around the periphery of each tube, the flaps being each provided with openings therein adapted to receive the projections on the companion tube.

5. A pneumatic tire comprising a tire casing mounted upon a rim member, an inner tube disposed within said tire casing and provided with a valve stem for inflating said tube, an opening in said rim adapted to receive said valve stem, means for holding said valve stem in proper relationship with said rim opening comprising cooperating bayonet joint members on the valve stem and the periphery of the rim opening.

6. A pneumatic tire comprising a tire casing mounted upon a rim member, an inner tube disposed within said tire casing and provided with a valve stem for inflating said tube, an opening in said rim adapted to receive said valve stem, means for holding said valve stem in proper relationship with said rim opening comprising spaced lugs on said valve stem adapted to cooperate with spaced arcuate retaining flanges on the rim.

7. A pneumatic tire comprising a tire casing mounted upon a rim member, an inner tube disposed within said tire casing and provided with a valve stem for inflating said tube, an opening in said rim adapted to receive said valve stem, means for holding said valve stem in proper relationship with said rim opening comprising two diametrically opposite flange members of relatively small diameter on the rim member adjacent the opening therein, and two diametrically opposite lugs of greater diameter than the rim flanges mounted on the valve stem, said lugs being of lesser width than the spaces between the rim flanges, said lugs being secured to the valve stem in such position that the inner tube must be slightly twisted from its normal position in the rim to permit the lugs to pass between the rim flanges.

8. A pneumatic tire comprising a tire casing and a pair of inner tubes disposed therein, each provided with valve means for purposes of inflation, and means for securing the tubes together comprising an integral perforated laterally extending flap mounted on each tube at a point diametrically opposite to its valve stem and adapted to fit over the valve stem of the other tube.

9. A pneumatic tire comprising a tire casing and a pair of annular inner tubes disposed therein, in side-by-side relationship, each provided with a valve stem for inflation purposes, and means for readily detachably securing said tubes to each other comprising an elastic flap member provided with an aperture therein adapted to fit tightly and elastically over the valve stem of the other tube.

10. A pneumatic tire comprising a tire casing, and a pair of inner tubes disposed therein each provided with a valve stem for inflation purposes, one of said valve stems being provided with an annular groove adjacent its point of juncture with the tube, and means for readily detachably securing said tubes to each other comprising an elastic flap member provided with an aperture therein adapted to fit tightly and elastically within the groove in the valve stem of the other tube.

11. A pneumatic tire consisting of an annular tire casing and two similar annular inner tubes disposed therein in side-by-side relationship each having portions engaging the outer periphery of the tire casing adjacent the tread portion thereof and additional portions engaging the inner periphery of the tire casing, and means external to the tubes for readily detachably securing together the portions of said tubes adjacent the inner periphery of the tire casing.

12. A pneumatic tire comprising a tire casing mounted upon a rim member, an inner tube disposed within said tire casing and provided with a valve stem for inflating said tube, an opening in said rim adapted to receive said valve stem, means for preventing dissociation of the valve stem and rim when the valve stem is held in its normal position by the inner tube and for permitting dissociation of the valve stem and rim when the valve stem is rotated to an abnormal position with respect to the rim.

13. A pneumatic tire comprising a tire casing and a pair of inner tubes disposed therein, each provided with valve means for purposes of inflation, and means for securing the tubes together comprising an integral perforated laterally extending flap mounted on each tube at a point adjacent the valve stem of the other tube and adapted to fit thereover.

EDWARD F. MAYNE.